(12) United States Patent
Jeong et al.

(10) Patent No.: US 12,058,247 B2
(45) Date of Patent: Aug. 6, 2024

(54) SECURE COMMUNICATION DEVICE EQUIPPED WITH QUANTUM ENCRYPTION CHIP BASED QUANTUM RANDOM NUMBER AND METHOD OF PROVIDING SECURE COMMUNICATION SERVICE USING THE SAME

(71) Applicant: EYL INC., Yongin-si (KR)

(72) Inventors: Bu Suk Jeong, Gyeonggi-do (KR); Dae Hyun Nam, Seoul (KR); Jung Hyun Baik, Seongnam-si (KR); Seong Joon Cho, Seongnam-si (KR); Kang Won Suh, Yongin-si (KR)

(73) Assignee: EYL INC., Yongin-si (KR)

( * ) Notice: Subject to any disclaimer, the term of this patent is extended or adjusted under 35 U.S.C. 154(b) by 211 days.

(21) Appl. No.: 17/800,053

(22) PCT Filed: Feb. 17, 2021

(86) PCT No.: PCT/KR2021/002002
§ 371 (c)(1),
(2) Date: Aug. 16, 2022

(87) PCT Pub. No.: WO2021/167336
PCT Pub. Date: Aug. 26, 2021

(65) Prior Publication Data
US 2023/0070408 A1 Mar. 9, 2023

(30) Foreign Application Priority Data

Feb. 17, 2020 (KR) .................. 10-2020-0018956
Feb. 17, 2020 (KR) .................. 10-2020-0018957
Feb. 17, 2020 (KR) .................. 10-2020-0018958

(51) Int. Cl.
*H04L 9/08* (2006.01)
*H04L 9/32* (2006.01)

(52) U.S. Cl.
CPC .......... *H04L 9/0852* (2013.01); *H04L 9/0869* (2013.01); *H04L 9/3226* (2013.01)

(58) Field of Classification Search
CPC ..................................................... H04L 9/0852
See application file for complete search history.

(56) References Cited

U.S. PATENT DOCUMENTS 5,307,410 A * 4/1994 Bennett .................. H04B 10/70
398/40
2011/0213979 A1* 9/2011 Wiseman .............. H04L 9/0844
713/171

(Continued)

FOREIGN PATENT DOCUMENTS

JP 2000-013368 A 1/2000
KR 10-2008-0051947 A 6/2008

(Continued)

OTHER PUBLICATIONS

International Search Report (with English Translation) issued on May 18, 2021 in corresponding International Patent Application No. PCT/KR2021/002002; 5 pages.

*Primary Examiner* — Simon P Kanaan
(74) *Attorney, Agent, or Firm* — NKL Law; Byungwoong Park (57) ABSTRACT

A method of providing a secure communication service using a secure communication device equipped with a quantum-random-number-based encryption chip. The method includes: in response to a first user terminal executing a secure communication device service app for secure communication and inputting a personal information number (PIN) or pattern, performing device authentication between a first user secure communication device and the first user terminal and then performing remote authentication between the first user terminal and a management server; in response to user authentication being completed, (Continued)

generating a quantum secret key a by a quantum encryption chip of the first user secure communication device and transmitting a quantum public key A to a second user secure communication device; and creating, by the first user secure communication device, a speech secure communication channel for communication with the second user secure communication device by inducing and storing the quantum encryption key.

6 Claims, 11 Drawing Sheets

(56) References Cited

U.S. PATENT DOCUMENTS

| | | | | |
|---|---|---|---|---|
| 2016/0315762 | A1* | 10/2016 | Moon | H04L 9/065 |
| 2018/0367309 | A1* | 12/2018 | Reinhold | H04L 9/0662 |
| 2019/0313246 | A1* | 10/2019 | Nix | H04W 80/10 |
| 2021/0081014 | A1* | 3/2021 | Newell | H04L 9/3213 |
| 2021/0135870 | A1* | 5/2021 | Uy | H04L 9/3218 |

FOREIGN PATENT DOCUMENTS

| | | |
|---|---|---|
| KR | 10-1107241 B1 | 1/2012 |
| KR | 10-2014-0054647 A | 5/2014 |
| KR | 10-2016-0121828 A | 10/2016 |
| KR | 10-2019-0034789 A | 4/2019 |

* cited by examiner

SECURE COMMUNICATION DEVICE EQUIPPED WITH QUANTUM ENCRYPTION CHIP BASED QUANTUM RANDOM NUMBER AND METHOD OF PROVIDING SECURE COMMUNICATION SERVICE USING THE SAME

FIELD

The present disclosure relates to an secure communication device equipped with a quantum-random-number-based quantum encryption chip and a method of providing a secure communication service using the same, and more particularly, to a secure communication device equipped with a quantum-random-number-based quantum encryption chip with improved security by enabling voice and data communication between end-to-end terminals through secure devices each equipped with a quantum-random-number-based quantum encryption chip, and a method of providing a secure communication service using the same.

BACKGROUND

Recently, technologies for eavesdropping the contents of wired and wireless calls have developed considerably and various kinds of information such as technical information and privacy information may be leaked, causing economic or social problems. Eavesdropping is widespread not only in the field of national defense fields, but also in information warfare between countries, competition between companies, and political activities. In particular, smartphones are vulnerable to hacking and eavesdropping, and the security of wireless communication networks is currently considered a serious issue.

In order to solve these problems, various types of secure communication devices have been developed, but such devices use secure communication technologies in which a pseudo-random number-based encryption key is generated, leading to vulnerability to hacking.

As a related art, there is Korean Patent No. 10-1107241 (DEVICE AND METHOD FOR PROVIDING SECURE COMMUNICATION) disclosing a technology for secure communication through a dongle for secure communication connected to a mobile phone, but there is a problem of security vulnerability.

SUMMARY

An object of the present disclosure is to provide a secure communication device equipped with a quantum-random-number-based quantum encryption chip to address security vulnerability and a method for providing a secure communication service using the same.

In order to accomplish the object, the present disclosure provides method of providing a secure communication service using a secure communication device equipped with a quantum-random-number-based encryption chip, the method including: in response to a first user terminal executing a secure communication device service app for secure communication and inputting a personal information number (PIN) or pattern, performing device authentication between a first user secure communication device and the first user terminal and then performing remote authentication between the first user terminal and a management server; in response to user authentication being completed, generating a quantum secret key a by a quantum encryption chip of the first user secure communication device and transmitting a quantum public key A to a second user secure communication device; and creating, by the first user secure communication device, a speech secure communication channel for communication with the second user secure communication device by inducing and storing the quantum encryption key.

The creating of the speech secure communication channel may include performing, by the first user terminal, a service for secure communication to perform device authentication through user authentication between the first user secure communication device and an application, and performing, by the first user terminal, remote authentication between the first user terminal and a management server; performing, by the second user terminal, a service for secure communication to perform device authentication through user authentication between the second user secure communication device and an application, and performing, by the second user terminal, remote authentication between the second user terminal and the management server; in response to a voice being input to the first user secure communication device when the authentication is completed, encrypting, by the first user secure communication device, audio data and transmitting, by the first user secure communication device, the encrypted audio data to the first user terminal; in response to a voice being input to the second user secure communication device when the authentication is completed, encrypting, by the second user secure communication device, audio data and transmitting, by the second user secure communication device, the encrypted audio data to the second user terminal; transmitting, by the first user terminal, the encrypted audio data to the second user secure communication device through the second user terminal, and decrypting, by the second user secure communication device, the audio data to output the decrypted audio data to a speaker; and transmitting, by the second user terminal, the encrypted audio data to the first user secure communication device through the first user terminal, and decrypting, by the first user secure communication device, the audio data to output the decrypted audio data to a speaker.

According to the present disclosure, as a secure communication device equipped with a quantum-random-number-based quantum encryption chip is used and voice and data communication between end-to-end terminals is enabled, it is possible to improve security using a quantum encryption key.

In addition, it is possible to improve security by providing a separate secure communication device separated from a smart phone or IoT device, and to flexibly interwork with various service platforms as various encryption algorithms are installed.

In addition, it is possible to enable secure communication with enhanced security between IoT devices by using a secure communication gateway equipped with a quantum-random-number-based quantum encryption chip.

In addition, it is possible to improve security by providing a separate secure communication gateway separated from a smartphone or IoT device, and to flexibly interwork with various service platforms as various encryption algorithms are installed.

DETAILED DESCRIPTION

Descriptions of specific structures or functions relating to certain embodiments derived based on the concept of the present disclosure as set forth in the present specification are provided merely as examples for explaining the embodiments derived from the concept of the present disclosure, and the embodiments can be practiced in a variety of implementations and are not limited to the embodiments described herein.

As the embodiments derived from the concept of the present disclosure allow for various modifications and can be implemented in various forms, certain embodiments are illustrated in the drawings and described in detail in the present specification. However, this is not intended to limit the embodiments derived from the concept of the present disclosure to the specific disclosed forms, and it is to be appreciated that all modifications, equivalents, and substitutes that do not depart from the spirit and technical scope of the present disclosure are encompassed in the present disclosure.

The terminology used herein is for the purpose of describing particular embodiments only and is not intended to be limiting of the present disclosure. As used herein, singular forms are intended to include plural forms as well, unless the context clearly indicates otherwise. In the present specification, it will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described in detail with reference to the accompanying drawings.

Figure 1:
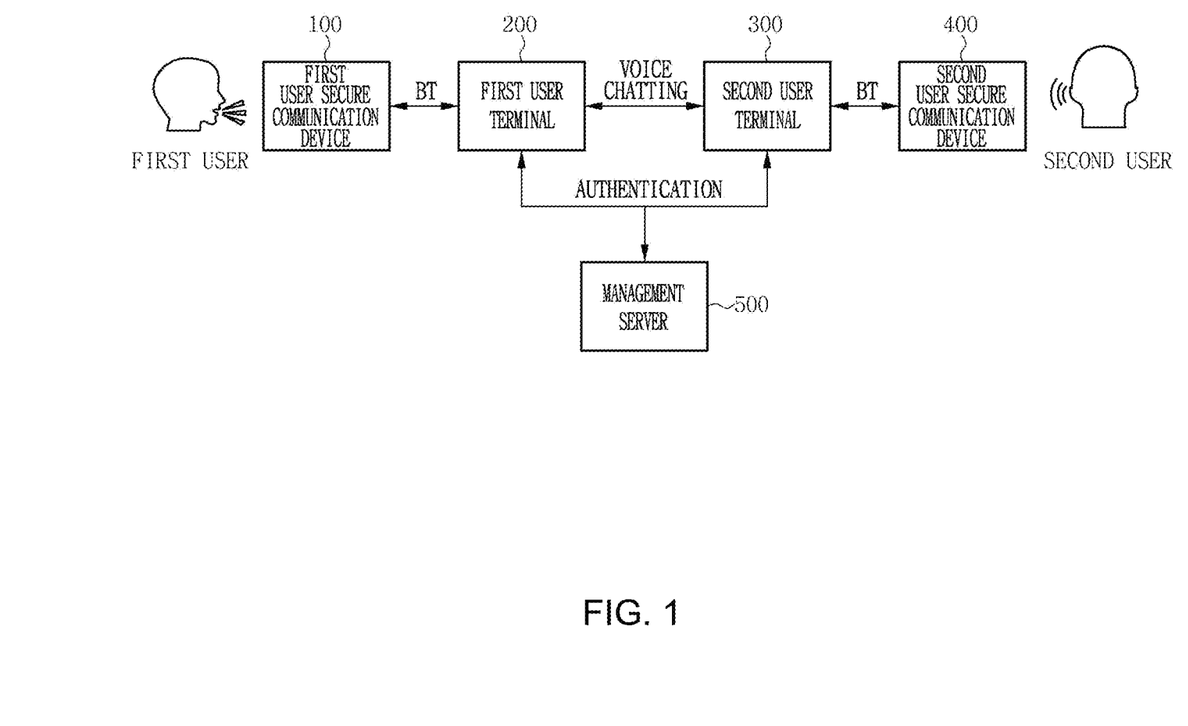
FIG. 1 is a conceptual diagram illustrating an operation method of a secure communication device equipped with an encryption chip based on a quantum random number according to an embodiment of the present disclosure.

FIG. 1 is a conceptual diagram illustrating an operation method of a secure communication device equipped with an encryption chip based on a quantum random number according to an embodiment of the present disclosure.

A first user may use a first user secure communication device 100 paired with a first user terminal 200 to perform secure voice communication with users authenticated by a management server 500. That is, when the first user, who is a sender, inputs a voice to a microphone of the first user secure communication device 100, the voice input from the first user secure communication device 100 may be encrypted based on a quantum encryption key, and encrypted audio data may be transmitted to the first user terminal 200, to a second user terminal 300 via a communication network, and then to a second user secure communication device 400 paired with the second user terminal 300 via Bluetooth, so that a second user can listen to the voice after decryption of a quantum-random-number-based quantum encryption key. That is, the first user and the second user may be able to perform secure communication with their respective authenticated secure communication devices and may use a quantum encryption key generated by a quantum-random-number-based quantum encryption chip, so that secure communication with improved security compared to existing secure communications is possible.

Figure 2:
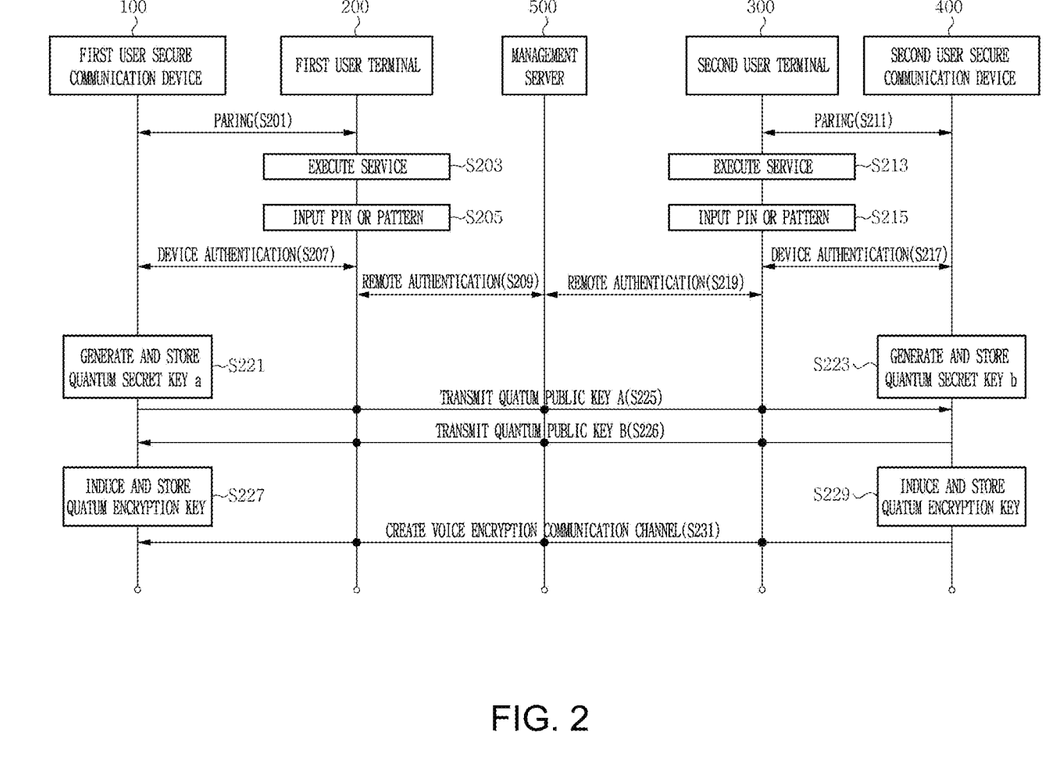
FIG. 2 is a flowchart illustrating a quantum key exchange method according to an embodiment of the present disclosure.

FIG. 2 is a flowchart illustrating a quantum encryption key exchange method according to an embodiment of the present disclosure.

Referring to FIG. 2, a first user secure communication device 100 and a first user terminal 200 are paired with each other via Bluetooth in operation S201, a service for secure communication is executed in the first user terminal 200 in operation S203 and a personal information number (PIN) or pattern is input to the first user terminal 200 for user authentication in operation S205. When user authentication is input with the PIN or pattern input, the first user secure communication device 100 and the first user terminal 200 perform device authentication with respect to each other in operation S207. Then, the first user terminal 200 performs remote authentication to the management server 500 in operation S209.

The second user secure communication device 400 and the second user terminal 300 are paired with each other via Bluetooth in operation S211, a service for secure communication is executed in the second user terminal 300 in operation S213, and a PIN or pattern is input to the second user terminal 300 for user authentication in operation S215. When user authentication is input with the PIN or pattern input, the second user secure communication device 400 and the second user terminal 300 perform device authentication with respect to each other in operation S217. Then, the second user terminal performs remote authentication to the management server 500 in operation S219.

When user authentication is completed, the first user secure communication device 100 generates and stores a quantum secret key a in operation S221, and the second user secure communication device 400 generates and stores a quantum secret key b in operation S223. In this case, the quantum secret key a and the quantum secret key b are quantum random numbers, which cannot be pattern analysis and prediction and may be generated as pure random numbers in disorder due to quantum properties.

The first user secure communication device 100 transmits a generated quantum public key A to the second user secure communication device 400 in operation S225, and the second user secure communication device 400 transmits a generated quantum public key B to the first user secure communication device 100 in operation S226, so that the first user secure communication device 100 and the second user secure communication device 400 exchange the quantum public keys with each other.

The first user secure communication device 100 derives and stores a quantum encryption key in operation S227, and the second user secure communication device 400 derives and stores a quantum encryption key in operation S229. The first user secure communication device 100 and the second user secure communication device 400 create a voice encryption communication channel in operation S231. At this point, a speech secure communication channel may be created, in which encryption/decryption is performed through a key encryption/decryption algorithm with a derived key derived from a quantum random number of the first user secure communication device and encryption/decryption is performed through the encryption/decryption algorithm with a derived key derived from a quantum random number of the second user secure communication device.

Figure 3:
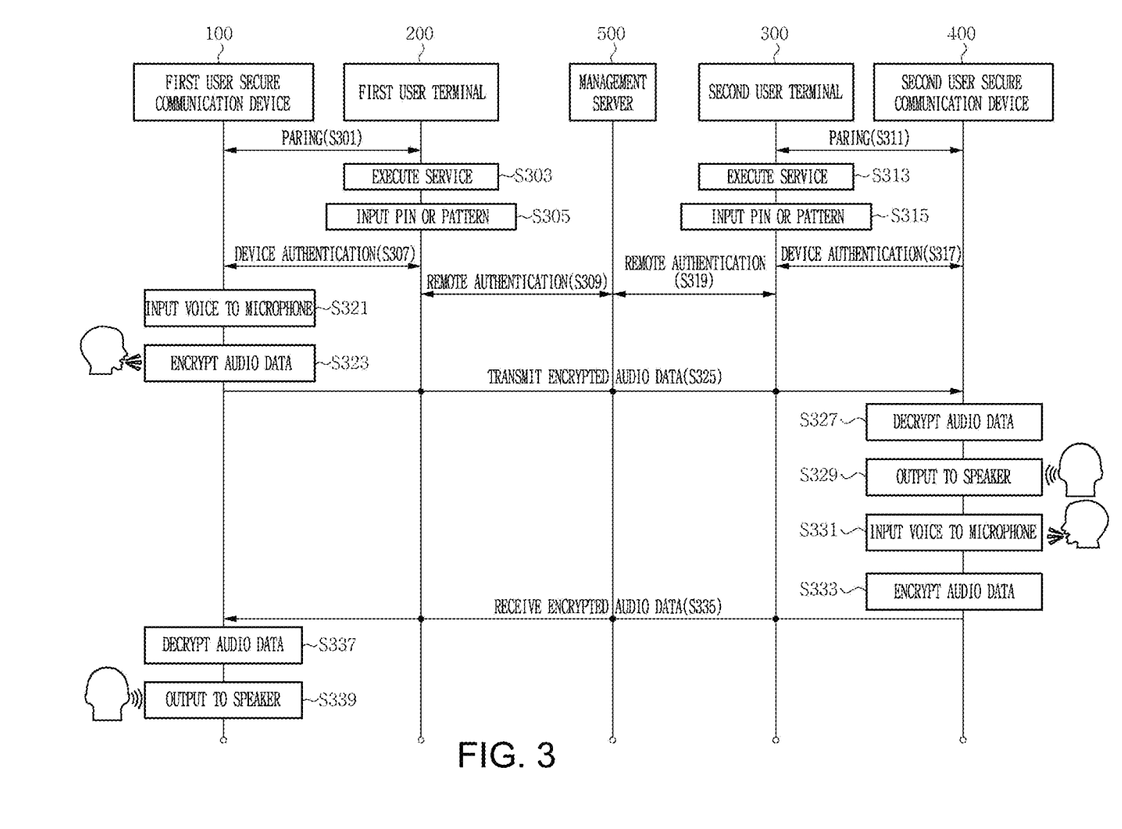
FIG. 3 is a flowchart illustrating a voice communication method according to an embodiment of the present disclosure.

FIG. 3 is a flowchart illustrating a voice communication method according to an embodiment of the present disclosure.

Referring to FIG. 3, a first user secure communication device 100 and a first user terminal 200 perform Bluetooth pairing in operation S301, a service for secure communication is executed in the first user terminal 200 in operation S303, and a PIN or pattern is input to the first user terminal 200 for user authentication in operation S305. When user authentication is input, for example, with the PIN or pattern input, the first user secure communication device 100 and the first user terminal 200 perform device authentication with respect to each other in operation S307. Then, the first user terminal 200 performs remote authentication to a management server 500 in operation S309.

A second user secure communication device 400 and a second user terminal 300 perform Bluetooth pairing with each other in operation S311, a service for secure communication is executed in the second user terminal 300 in operation S313, a PIN or pattern is input to the second user terminal 300 for user authentication in operation S315. When user authentication is input, for example, with the PIN or pattern input, the second user secure communication device 400 and the second user terminal 300 perform device authentication with respect to each other in operation S317. Then, the second user terminal performs remote authentication to the management server 500 in operation S319.

When a first user inputs a voice to a microphone of the first user secure communication device 100 in operation S321, the first user secure communication device 100 encrypts the received audio data in operation S323 and transmits the encrypted audio data to the first user terminal 200. The first user terminal 200 transmits the encrypted audio data to the second user secure communication device 400 through the management server 500 and the second user terminal 300 in operation S325. The second user secure communication device 400 decodes the received audio data in operation S327 and outputs the decoded audio data to a speaker thereof in operation S329.

When a second user inputs a voice to a microphone of the second user secure communication device in operation S331, the second user secure communication device 400 encrypts the received audio data in operation S333 and transmits the encrypted audio data to the second user terminal 300. The second user terminal 300 transmits the encrypted audio data to the first user secure communication device 100 through the first user terminal 100 in operation S325. The first user secure communication device 100 decodes the received audio data in operation S337 and outputs the decoded audio data to a speaker thereof in operation S339.

Figure 4:
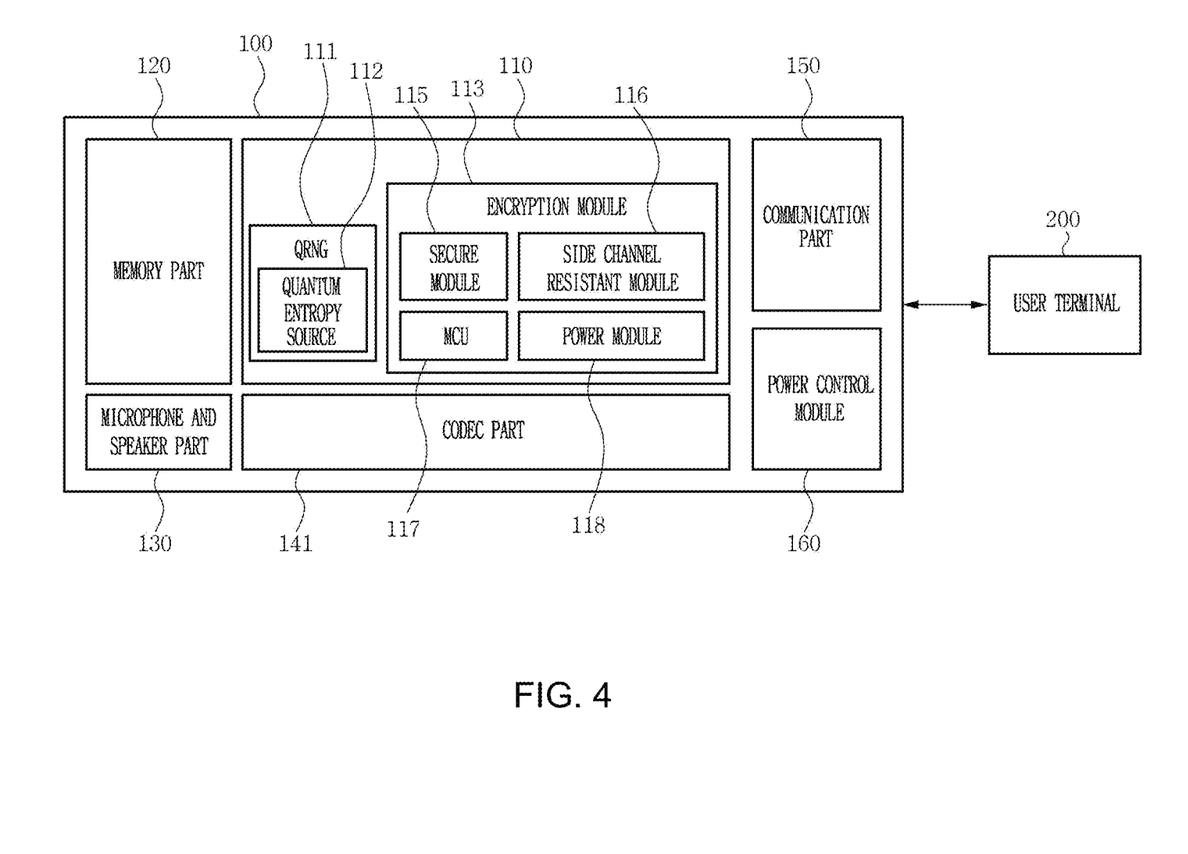
FIG. 4 is a block diagram illustrating a configuration of a secure communication device according to an embodiment of the present disclosure.

FIG. 4 is a block diagram illustrating a configuration of a secure communication device according to an embodiment of the present disclosure.

Referring to FIG. 4, a secure communication device 100 includes a quantum encryption chip 110, a memory part 120, a microphone and speaker part 130, a codec part 141, a communication part 150, and a power control module 160.

The quantum encryption chip 110 includes a quantum random number generator (QRNG) 111 and an encryption module 113. The quantum random number generator 111 may be equipped with a quantum entropy source 112 to generate a quantum random number using the quantum entropy source 112. The quantum random number may be generated as a pure random number, which does not allow pattern analysis and prediction and is in disorder due to quantum properties.

The QRNG 111 includes a quantum entropy source 112, and the QRNG 111 may generate a quantum random number by a DRBG algorithm by using the quantum entropy source 112 as an input value.

The encryption module 113 includes a secure module 115, a microcontroller unit (MCU) 117, a side channel resistant module 116, and a power module 118. The encryption module 113 generates a quantum encryption key using a quantum random number generated by the QRNG 111. An encryption target may be encrypted and decrypted with the generated quantum encryption key using an AES algorithm in the secure module 115, and a generated encryption key may be stored. The Side Channel Resistant module 116 may protect the stored encryption key from a side channel attack (SCA Attack).

As the main memory of the secure communication device, the memory part 120 may store the generated quantum key.

The microphone and speaker part 130 may receive a voice input from the user or may convert the other party's voice into audio and output the audio.

The codec part 141 may convert a voice signal into a digital signal.

The communication part 150 may be connected to a user terminal through Bluetooth, and when registered in the user terminal according to a predetermined registration procedure, the communication part 150 may identify a connected user based on a unique address of a secure communication device registered in the user terminal using a Bluetooth user authentication function.

Figure 5:
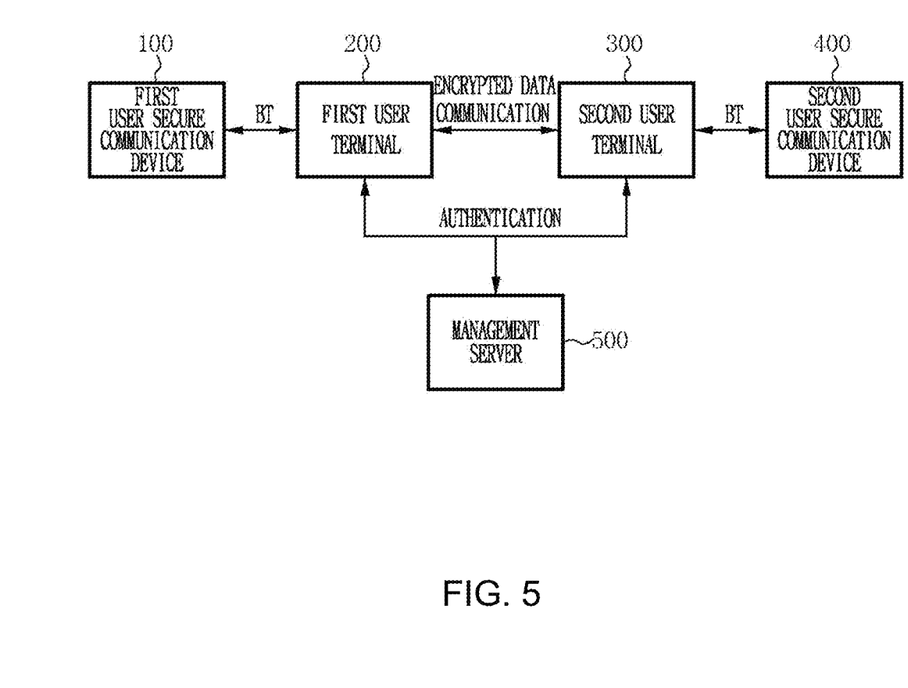
FIG. 5 is a conceptual diagram illustrating an operation method of a secure communication device equipped with an encryption chip based on a quantum random number according to another embodiment of the present disclosure.

FIG. 5 is a conceptual diagram illustrating an operation method of a secure communication device equipped with an encryption chip based on a quantum random number according to another embodiment of the present disclosure.

Referring to FIG. 5, a first user may perform secure data communication with users authenticated by a management server 500 using a first user secure communication device 100 paired with a first user terminal 200 via Bluetooth. That is, when the first user, who is a sender, inputs data (a text message or file) to the first user terminal 200, the input data is transmitted to the first user secure communication device 100 and encrypted based on the quantum encryption key, and after the encrypted data is transmitted to the first user terminal 200, the encrypted data is transmitted to the second user terminal 300 via a communication network and then to the second user secure communication device 400 paired with the second user terminal 300 via Bluetooth to be decrypted using a quantum encryption key based on a quantum random number, so that the second user can check the data. That is, the first user and the second user use quantum encryption keys generated by quantum-random-number-based quantum encryption chips installed in secure communication devices paired with user terminals, so that secure communication with more improved security than existing secure communication is possible.

Figure 6:
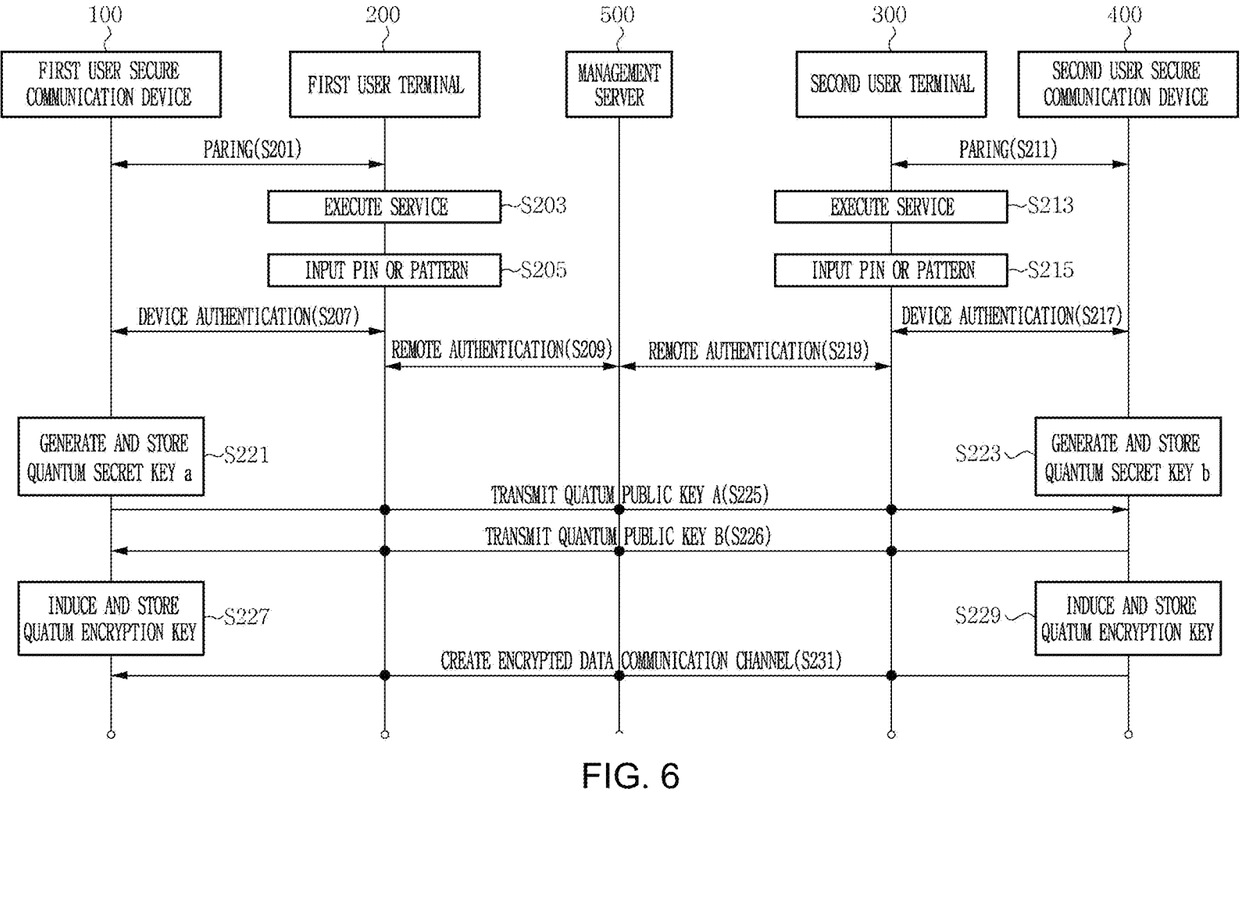
FIG. 6 is a flowchart illustrating a quantum key exchange method according to another embodiment of the present disclosure.

FIG. 6 is a flowchart illustrating a quantum key exchange method according to another embodiment of the present disclosure. Referring to FIG. 6, a first user secure communication device 100 and a first user terminal 200 are paired with each other via Bluetooth in operation S201, a service for secure communication is executed in the first user terminal 200 in operation S203, and a PIN or pattern is input to the first user terminal 200 for user authentication in operation S205. When user authentication is requested with the PIN or pattern input, the first user secure communication device 100 and the first user terminal 200 perform device authentication with respect to each other in operation S207. Then, the first user terminal 200 performs remote authentication to the management server 500 in operation S209.

The second user secure communication device 400 and the second user terminal 300 are paired with each other via Bluetooth in operation S211, a service for secure communication is executed in the second user terminal 300 in operation S213, and a PIN or pattern is input to the second user terminal 300 for user authentication in operation S215. When user authentication is requested with the PIN number or pattern input, the second user secure communication device 400 and the second user terminal 300 perform device authentication with respect to each other in operation S217. Then, the second user terminal performs remote authentication to the management server 500 in operation S219.

When user authentication is completed, the first user secure communication device 100 generates and stores a quantum secret key a in operation S221, and the second user secure communication device 400 generates and stores a quantum secret key b in operation S223. In this case, the quantum secret key a and the quantum secret key b are quantum random numbers, which do not allow pattern analysis and prediction and may be generated as pure random numbers in disorder due to quantum properties.

The first user secure communication device 100 transmits a generated quantum public key A to the second user secure communication device 400 in operation S225, and the second user secure communication device 400 transmits a generated quantum public key B to the first user secure communication device 100 in operation S226, so that the first user secure communication device 100 and the second user secure communication device 400 exchange the quantum public keys with each other.

The first user secure communication device 100 derives and stores a quantum encryption key in operation S227, and the second user secure communication device 400 derives and stores a quantum encryption key in operation S229. In doing so, the first user secure communication device 100 and the second user secure communication device 400 create an encrypted data communication channel in operation S231. At this point, an encrypted data communication channel may be created, in which encryption/decryption is performed through a key encryption/decryption algorithm with a derived key derived from a quantum random number of the first user secure communication device and encryption/decryption is performed through then encryption/decryption algorithm with a derived key derived from a quantum random number of the second user secure communication device.

Figure 7:
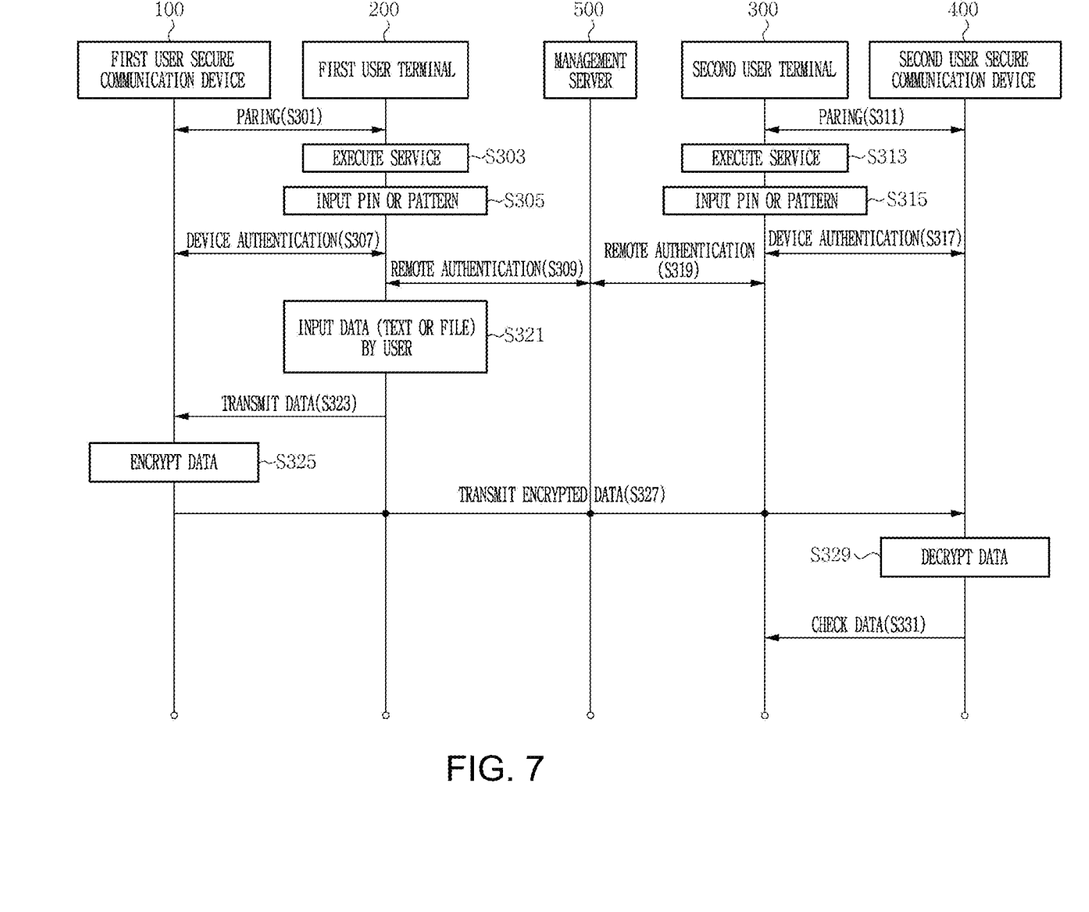
FIG. 7 is a flowchart illustrating a data communication method according to another embodiment of the present disclosure.

FIG. 7 is a flowchart illustrating a data communication method according to another embodiment of the present disclosure. Referring to FIG. 7, a first user secure communication device 100 and a first user terminal 200 are paired with each other via Bluetooth in operation S301, a service for secure communication is executed in the first user terminal 200 in operation S303, and a PIN or pattern is input to the first user terminal 200 for user authentication in operation S305. When user authentication is input, for example, with the PIN or pattern input, the first user secure communication device 100 and the first user terminal 200 perform device authentication with respect to each other in operation S307. Then, the first user terminal 200 performs remote authentication to a management server 500 in operation S309.

A second user secure communication device 400 and a second user terminal 300 perform Bluetooth pairing with each other in operation S311, a service for secure communication is executed in the second user terminal 300 in operation S313, a PIN or pattern is input to the second user terminal 300 for user authentication in operation S315. When user authentication is input, for example, with the PIN or pattern input, the second user secure communication device 400 and the second user terminal 300 perform device authentication with respect to each other in operation S317. Then, the second user terminal performs remote authentication to the management server 500 in operation S319.

When a first user inputs data (a text message or file) to the first user terminal in operation S321, the first user terminal 200 transmits the data to the first user secure communication device in operation S323. The first user secure communication device encrypts the received data using a quantum encryption key in operation S325 and transmits the encrypted data to the first user terminal 200. The first user terminal 200 transmits the encrypted data to the second user secure communication device 400 via a management server 500 and the second user terminal 300 in operation S327. The second user secure communication device 400 decrypts the received data using the quantum encryption key in operation S329 and transmits the decrypted data to the second user terminal 300 so that the second user checks the data in operation S331.

That is, the first user (sender) and the second user (receiver) use the quantum encryption key generated by the secure communication device paired with the user terminal, so that secure communication with more improved security than existing secure communication is possible.

Figure 8:
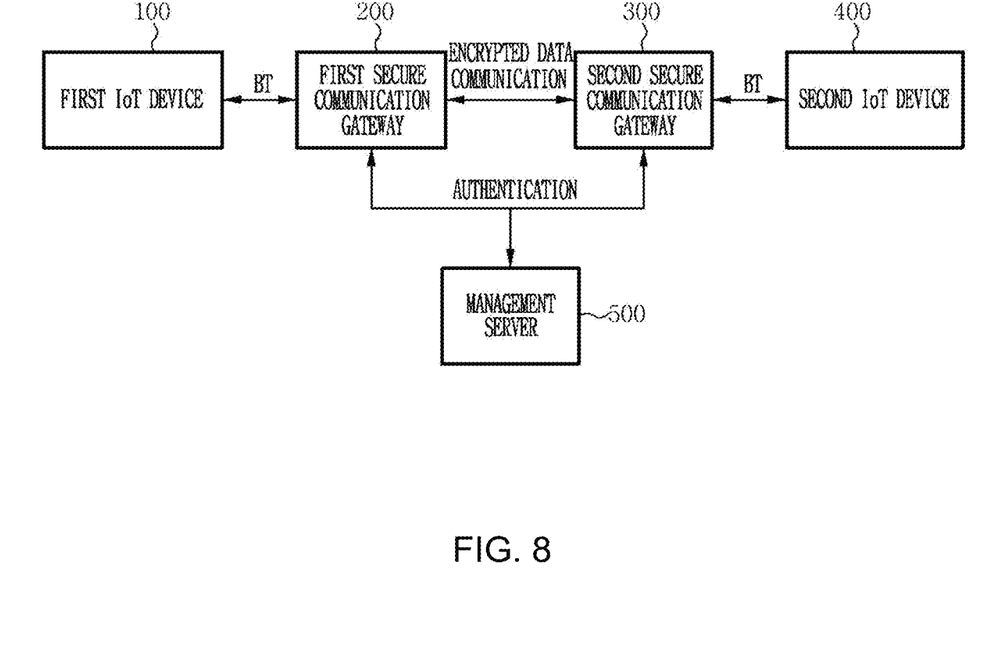
FIG. 8 is a conceptual diagram illustrating an operation method of a secure communication gateway equipped with an encryption chip based on a quantum random number according to another embodiment of the present disclosure.

FIG. 8 is a conceptual diagram illustrating an operation method of a secure communication gateway equipped with an encryption chip based on a quantum random number according to another embodiment of the present disclosure. Referring to FIGS. 8 to 11 illustrate a secure communication gateway equipped with a quantum-random-number-based quantum encryption chip with improved security by enabling encryption communication through the secure communication gateway equipped with the quantum-random-number-based quantum encryption chip, and a method for providing a secure communication service between Internet of Things (IoT) using the same.

Referring to FIG. 8, secure communication with IoT devices authenticated by a management server 500 may be enabled using a first IoT device 100 that is paired with a first secure communication gateway 200 via Bluetooth. That is, when the first IoT device, which is a sender, transmits collected data to a first secure communication gateway 200, the transmitted data may be encrypted based on a quantum encryption key by the first secure communication gateway, the encrypted data may be transmitted to a second secure communication gateway 300 via a communication network, and the second secure communication gateway 300 may decrypt the encrypted data using the quantum encryption key based on a quantum random number and the decrypted data may be transmitted to the second IoT device, thereby enabling secure communication. That is, the first IoT device and the second IoT device use the quantum encryption key generated by a quantum-random-number-based quantum encryption chip installed in the secure communication gateway paired with each of the first and second IoT devices, thereby enabling secure communication with more improved security than existing secure communication.

Figure 9:
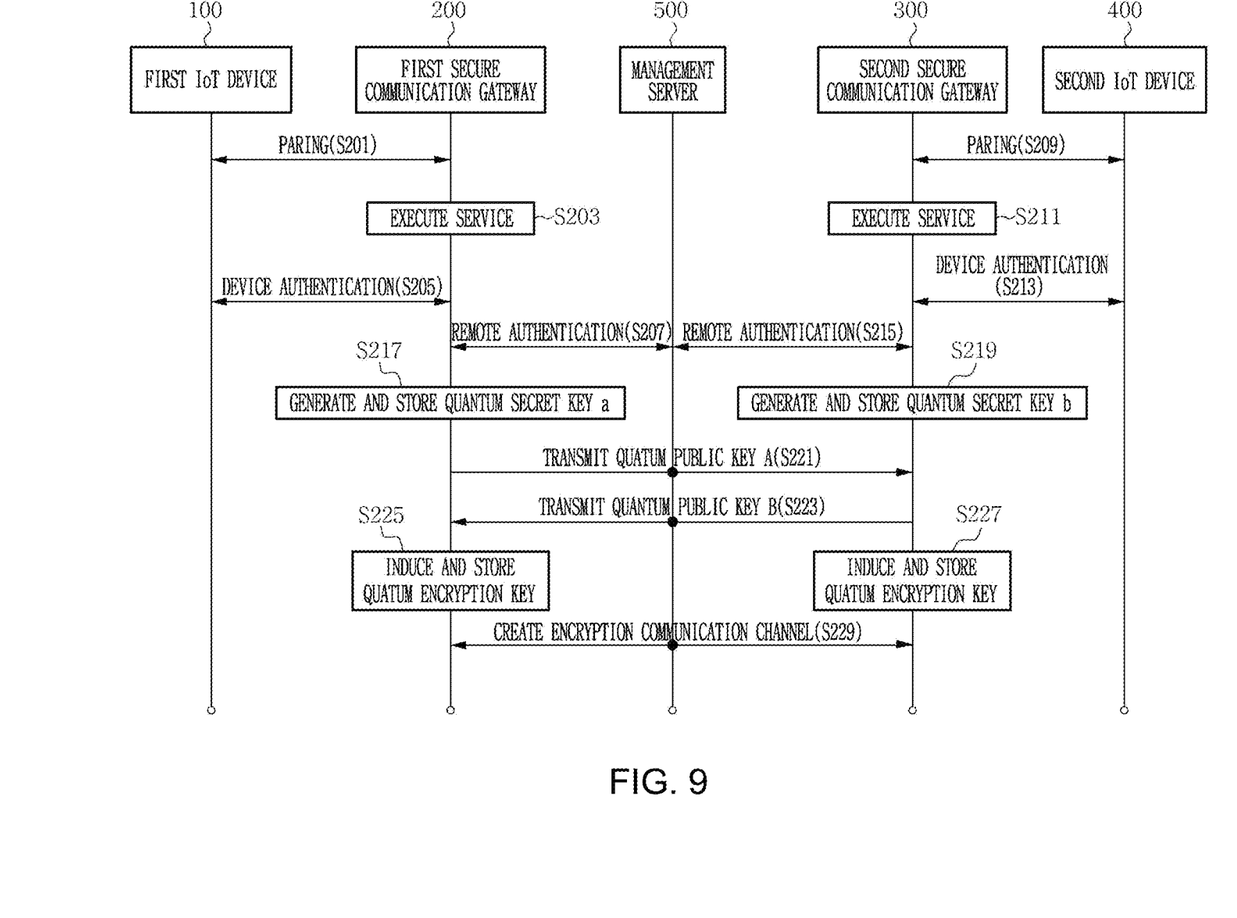
FIG. 9 is a flowchart illustrating a quantum key exchange method according to another embodiment of the present disclosure.

FIG. 9 is a flowchart illustrating a quantum key exchange method according to another embodiment of the present disclosure.

Referring to FIG. 9, when a first IoT device 100 and a first secure communication gateway 200 are paired with each other in operation S201 and a service is executed in operation S203, the first secure communication gateway 200 and the first IoT device 100 perform device authentication with respect to each other in operation S205. Then, the first secure communication gateway 200 performs remote authentication to a management server 500 in operation S207.

When a second secure communication gateway 300 and a second IoT device 400 are paired with each other in operation S209 and a service is executed in operation S211, the second secure communication gateway 300 and the second IoT device 400 perform device authentication with respect to each other in operation S213. Then, the second secure communication gateway 300 performs remote authentication to the management server 500 in operation S215.

When the device authentication is completed, the first encryption gateway 200 generates and stores a quantum secret key a in operation S217 and the second encryption gateway 300 generates and stores a quantum secret key b in operation S219. In this case, the quantum secret key a and the quantum secret key b are quantum random numbers, which cannot be pattern analysis and prediction and may be generated as pure random numbers in disorder due to quantum properties.

The first encryption gateway 200 transmits a generated quantum public key A to the second encryption gateway 300 in operation S221, and the second encryption gateway 300 transmits a generated quantum public key B to the first encryption gateway 200 in operation S223, so that the first encryption gateway 200 and the second encryption gateway 300 exchange the quantum public keys with each other.

The first secure communication gateway 200 derives and stores the quantum encryption key in operation S225, and the second secure communication gateway 300 derives and stores the quantum encryption key in operation S227. In doing so, the first secure communication gateway 100 and the second secure communication gateway 300 create an encrypted communication channel in operation S229. At this point, an encryption communication channel may be created, in which encryption/decryption is performed through a key encryption/decryption algorithm with a derived key derived from a quantum random number generated in the first secure communication gateway and encryption/decryption is performed through the encryption/decryption algorithm with a derived key derived from a quantum random number generated at the second secure communication gateway.

Figure 10:
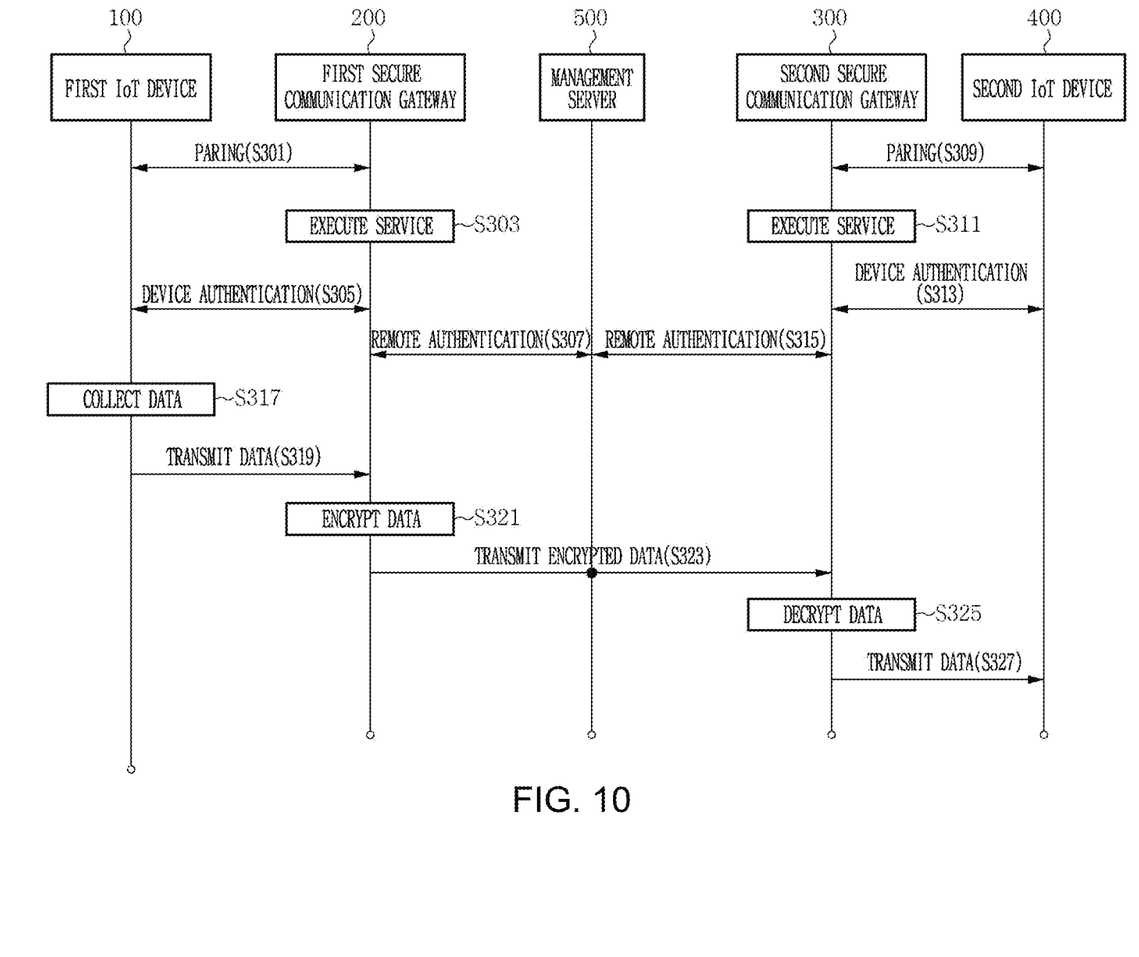
FIG. 10 is a flowchart illustrating a secure communication method between Internet of Things (IoT) devices according to another embodiment of the present disclosure.

FIG. 10 is a flowchart illustrating an secure communication method between Internet of Things (IoT) devices according to another embodiment of the present disclosure.

Referring to FIG. 10, when a first IoT device 1000 and a first secure communication gateway 2000 are paired with each other via Bluetooth in operation S301 and a service is executed in operation S303, the first secure communication gateway 2000 and the first IoT device 1000 perform device authentication with respect to each other in operation S305. Then, the first secure communication gateway 2000 performs remote authentication to a management server 5000 in operation S307.

When a second secure communication gateway 3000 and a second IoT device 4000 are paired with each other via Bluetooth in operation S309 and a service is executed in operation S311, the second secure communication gateway 3000 and the second IoT device 4000 perform device authentication with respect to each other in operation S313. Then, the second secure communication gateway 3000 performs remote authentication to the management server 5000 in operation S315.

Upon collecting data, the first IoT device 1000 transmits the collected data to the first secure communication gateway in operation S319. The first encryption gateway 2000 encrypts the received data in operation S325 and transmits the encrypted data to the first encryption gateway 3000 via a communication network in operation S323. The second secure communication gateway 3000 decrypts the received data in operation S325 and transmits the decrypted data to the second IoT device 4000 in operation S327.

That is, the first IoT device (sender) and the second IoT device (receiver) use the quantum encryption key generated by the paired secure communication gateway, so that secure communication with more improved security than the conventional secure communication is possible.

Figure 11:
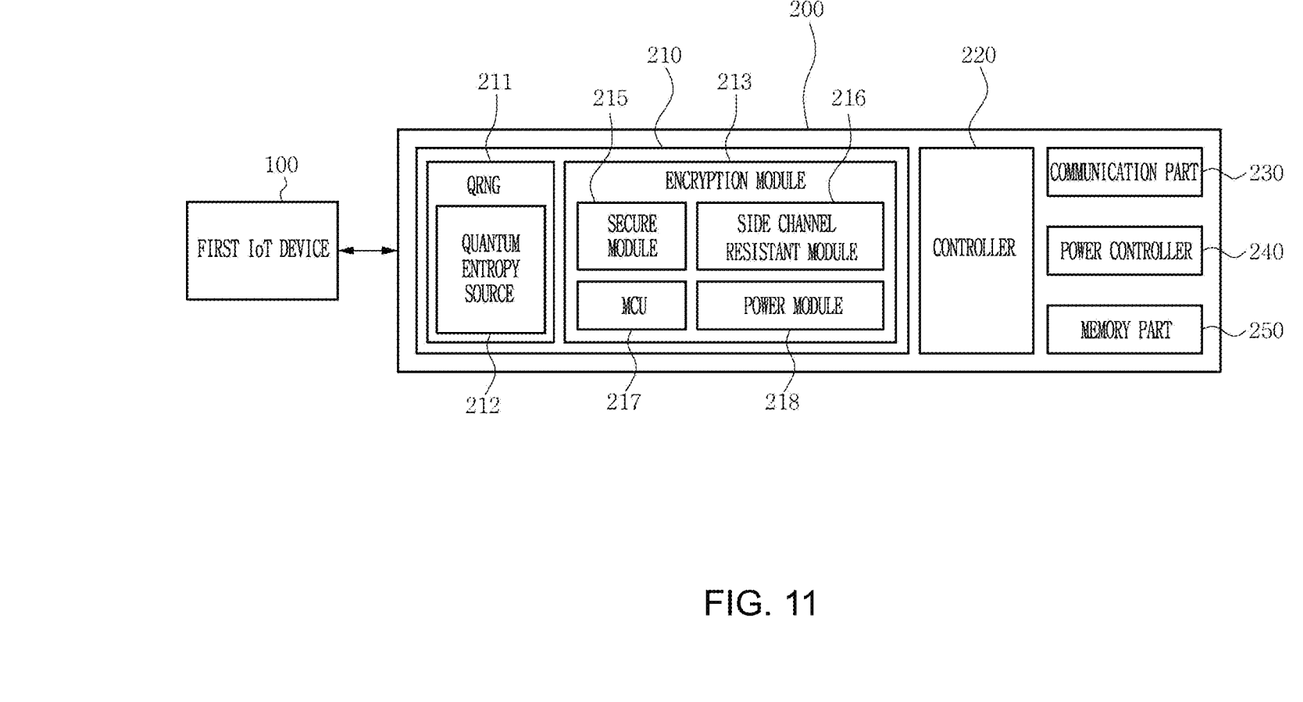
FIG. 11 is a block diagram illustrating a configuration of a secure communication gateway according to another embodiment of the present disclosure.

FIG. 11 is a block diagram illustrating a configuration of a secure communication gateway according to another embodiment of the present disclosure. Referring to FIG. 11, a secure communication gateway 2000 includes a quantum encryption chip 2100, a controller 2200, a communication part 2300, a power controller 2400, and a memory 2500.

The quantum encryption chip 2100 includes a quantum random number generator (QRNG) 2110 and an encryption module 2130. The quantum entropy source 2120 may be provided in the QRNG 2110 to generate a quantum random number based on the quantum entropy source. The quantum random number may be generated as a pure random number, which does not allow pattern analysis and prediction and is in disorder due to quantum properties.

The QRNG 2110 may include a quantum entropy source 2120, and the QRNG 2110 may generate a quantum random number by a DRBG algorithm using the quantum entropy source 2120 as an input value.

The encryption module 2130 includes a secure module 2150, a microcontroller unit (MCU) 2170, a side channel resistant module 2160, and a power module 2180. The encryption module 2130 generates a quantum encryption key using a quantum random number generated by the QRNG 2110. An encryption target may be encrypted and decrypted with the generated quantum encryption key using the AES algorithm in the secure module 2150, and the generated encryption key may be stored. The side channel resistant module 2160 may protect the stored encryption key from a side channel attack (SCA Attack).

The communication part 2300 may be connected to an IoT device via Bluetooth, and when registered in the user terminal according to a predetermined registration procedure, a connected user may be identified based on a unique address of the secure communication gateway registered in the IoT device using a Bluetooth user authentication function. The power controller 2400 may control power of the secure communication gateway. As the main memory of the secure communication gateway, the memory part 2500 may store the generated quantum key.

Although the present disclosure has been described with reference to some embodiments, it should be understood that the foregoing embodiments are provided for illustrative purposes only, and that various modifications, changes, alterations, and equivalent embodiments can be made by those skilled in the art without departing from the spirit and scope of the present disclosure. Therefore, the scope of the present disclosure should be limited only by the accompanying claims and equivalents thereof.

The invention claimed is:

1. A method of providing a secure communication service using a secure communication device equipped with a quantum-random-number-based quantum encryption chip, the method comprising:

in response to a first user terminal executing a secure communication device service app for secure communication and inputting a personal information number (PIN) or pattern, performing device authentication between a first user secure communication device and the first user terminal and then performing remote authentication between the first user terminal and a management server;

in response to user authentication being completed, generating a quantum secret key a by a quantum encryption chip of the first user secure communication device and transmitting a quantum public key A to a second user secure communication device; and creating, by the first user secure communication device, a speech secure communication channel for communication with the second user secure communication device by inducing and storing the quantum encryption key.

2. The method of claim 1, wherein in the creating of the speech secure communication channel, encryption/decryption is performed through a key encryption/decryption algorithm with a derived key derived from a quantum random number of the first user secure communication device and encryption/decryption is performed through an encryption/decryption algorithm with a derived key derived from a quantum random number of the second user secure communication device.

3. A method of providing a secure communication service using a secure communication device equipped with a quantum-random-number-based quantum encryption chip, the method comprising:

performing, by a first user terminal, a service for secure communication to perform device authentication through user authentication between a first user secure communication device and an application, and performing, by the first user terminal, remote authentication between the first user terminal and a management server;

performing, by a second user terminal, a service for secure communication to perform device authentication through user authentication between a second user secure communication device and an application, and performing, by the second user terminal, remote authentication between the second user terminal and the management server;

in response to a voice being input to the first user secure communication device when the authentication is completed, encrypting, by the first user secure communication device, audio data and transmitting, by the first user secure communication device, the encrypted audio data to the first user terminal;

in response to a voice being input to the second user secure communication device when the authentication is completed, encrypting, by the second user secure communication device, audio data and transmitting, by the second user secure communication device, the encrypted audio data to the second user terminal;

transmitting, by the first user terminal, the encrypted audio data to the second user secure communication device through the second user terminal, and decrypting, by the second user secure communication device, the audio data to output the decrypted audio data to a speaker; and transmitting, by the second user terminal, the encrypted audio data to the first user secure communication device through the first user terminal, and decrypting, by the first user secure communication device, the audio data to output the decrypted audio data to a speaker.

4. The method of claim 3, wherein the audio data is encrypted and decrypted through an encryption/decryption algorithm with a quantum key derived from a quantum random number of the first user secure communication device, and the audio data is encrypted and decrypted through an encryption/decryption algorithm with a quantum key derived from a quantum random number of the second user secure communication device.

5. The method of claim 1, wherein the first user secure communication device and the second user secure communication device each comprises a quantum encryption chip that comprises a quantum entropy source and an encryption module, and wherein the quantum encryption chip is equipped with a quantum random number generator to generate a quantum random number, and the quantum random number is generated as a pure random number using quantum properties.

6. The method of claim 3, wherein the first user secure communication device and the second user secure communication device each comprises a quantum encryption chip that comprises a quantum entropy source and an encryption module, and wherein the quantum encryption chip is equipped with a quantum random number generator to generate a quantum random number, and the quantum random number is generated as a pure random number using quantum properties.

* * * * *